United States Patent
Morioka et al.

(10) Patent No.: US 11,349,131 B2
(45) Date of Patent: May 31, 2022

(54) CATALYST FOR FUEL CELLS, MEMBRANE ELECTRODE ASSEMBLY, AND POLYMER ELECTROLYTE FUEL CELL

(71) Applicants: TOPPAN PRINTING CO., LTD., Tokyo (JP); HIROSAKI UNIVERSITY, Aomori (JP)

(72) Inventors: Hiroyuki Morioka, Tokyo (JP); Madoka Ozawa, Tokyo (JP); Mitsuharu Chisaka, Hirosaki (JP)

(73) Assignees: TOPPAN PRINTING CO., LTD., Tokyo (JP); HIROSAKI UNIVERSITY, Aomori (JP)

( * ) Notice: Subject to any disclaimer, the term of this patent is extended or adjusted under 35 U.S.C. 154(b) by 43 days.

(21) Appl. No.: 17/082,896

(22) Filed: Oct. 28, 2020

(65) Prior Publication Data
US 2021/0135247 A1     May 6, 2021

(30) Foreign Application Priority Data
Nov. 1, 2019    (JP) .............................. JP2019-200163

(51) Int. Cl.
*H01M 4/90*     (2006.01)
*H01M 4/86*     (2006.01)
*H01M 4/92*     (2006.01)
*H01M 8/1004*     (2016.01)
*H01M 8/10*     (2016.01)

(52) U.S. Cl.
CPC ....... *H01M 4/9016* (2013.01); *H01M 4/8657* (2013.01); *H01M 4/926* (2013.01); *H01M 8/1004* (2013.01); *H01M 2008/1095* (2013.01)

(58) Field of Classification Search
CPC .. H01M 4/9016; H01M 4/8657; H01M 4/926; H01M 8/1004
See application file for complete search history.

(56) References Cited

FOREIGN PATENT DOCUMENTS

| JP | 2012-246559 | * | 12/2012 | ........... C01B 21/097 |
| JP | 2016-219179 | A | 12/2016 | |
| WO | WO-2018117254 | A1 * | 6/2018 | .............. B01J 27/24 |

* cited by examiner

*Primary Examiner* — Helen Oi K Conley
(74) *Attorney, Agent, or Firm* — Squire Patton Boggs (US) LLP

(57) ABSTRACT

Provided is a catalyst for fuel cells including an oxygen atom, a nitrogen atom, a pentavalent phosphorus atom, and a transition metal atom, in which when the transition metal atom is represented by M, the catalyst for fuel cells is represented by a chemical formula $MO_xN_yP_z$, and the transition metal atom is at least one selected from the group consisting of a titanium atom, a tantalum atom, a niobium atom, and a zirconium atom.

6 Claims, 10 Drawing Sheets

US 11,349,131 B2

CATALYST FOR FUEL CELLS, MEMBRANE ELECTRODE ASSEMBLY, AND POLYMER ELECTROLYTE FUEL CELL

1. RELATED APPLICATION

This application claims the benefit and priority to Japanese Patent Application No. 2019-200163, filed on Nov. 1, 2019.

2. FIELD

The following disclosure relates to catalyst for fuel cells used for polymer electrolyte fuel cells, a membrane electrode assembly, and a polymer electrolyte fuel cell.

3. DESCRIPTION OF RELATED ART

A polymer electrolyte fuel cell includes a membrane electrode assembly formed of a polymer electrolyte membrane and two electrode catalyst layers. Each electrode catalyst layer includes a polymer electrolyte, a catalyst, a catalyst support, and a fibrous substance. The catalyst promotes oxygen reduction reaction in the electrode catalyst layer containing the catalyst. That is, the catalyst increases the reaction rate of oxygen reduction reaction in the electrode catalyst layer containing the catalyst. The catalyst includes platinum having high catalytic activity for oxygen reduction reaction (see Japanese Laid-Open Patent Publication No. 2016-219179, for example).

Platinum is a rare metal and is also an expensive metal. Therefore, a catalyst retaining catalytic activity for oxygen reduction reaction even with a composition in which a content of platinum is limited is required for catalyst for fuel cells.

SUMMARY

An object of the present disclosure is to provide a catalyst for fuel cells, a membrane electrode assembly, and a polymer electrolyte fuel cell, enabling catalytic activity for oxygen reduction reaction to be exerted even in a composition in which the content of platinum is limited.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect is a catalyst for fuel cells including an oxygen atom, a nitrogen atom, a pentavalent phosphorus atom, and a transition metal atom, in which when the transition metal atom is represented by M, the catalyst for fuel cells is represented by a chemical formula $MO_xN_yP_z$, and the transition metal atom is at least one selected from the group consisting of a titanium atom, a tantalum atom, a niobium atom, and a zirconium atom.

Another aspect is a membrane electrode assembly including a solid polymer electrolyte membrane and an electrode catalyst layer including the catalyst for fuel cells described above, a polymer electrolyte, and a conductive material. The electrode catalyst layer is bonded to the solid polymer electrolyte membrane.

Yet another aspect is a polymer electrolyte fuel cell including the membrane electrode assembly described above and a second electrode catalyst layer.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
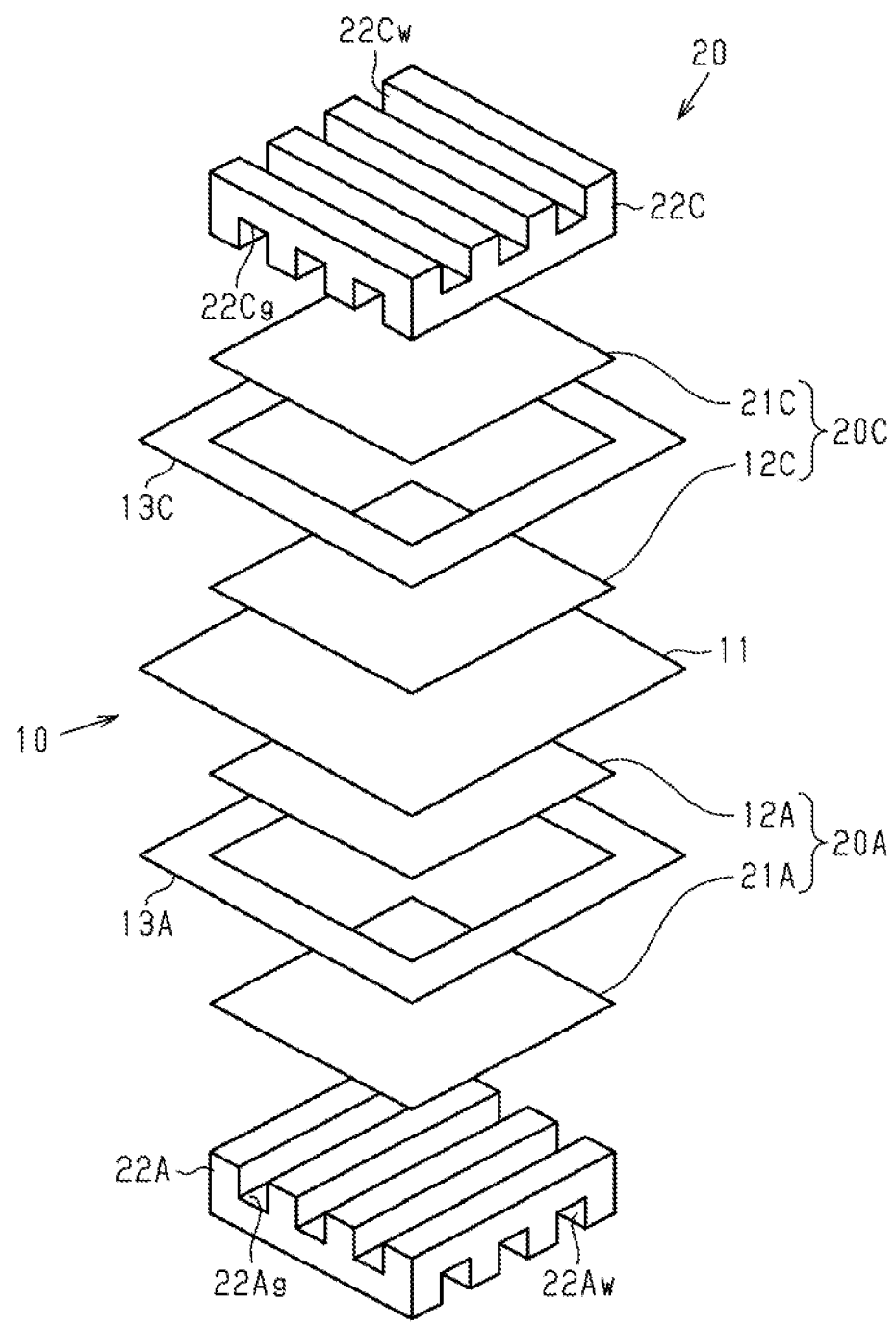
FIG. 1 is an exploded perspective view illustrating a structure of a polymer electrolyte fuel cell according to one embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of each of a catalyst for fuel cells, an electrode catalyst layer, a membrane electrode assembly, a polymer electrolyte fuel cell, a manufacturing method of the catalyst for fuel cells, and a manufacturing method of the electrode catalyst layer will be described with reference to FIGS. 1 to 13. Hereinafter, a catalyst for fuel cells, a manufacturing method of the catalyst for fuel cells, a polymer electrolyte fuel cell, and a manufacturing method of a membrane electrode assembly will be described in order.

[Catalyst for Fuel Cells]

The catalyst for fuel cells is a catalyst used for a polymer electrolyte fuel cell. The polymer electrolyte fuel cell includes a membrane electrode assembly formed of a solid electrolyte membrane and two electrode catalyst layers. The solid electrolyte membrane is sandwiched between the two electrode catalyst layers in the thickness direction of the solid electrolyte membrane. The catalyst for fuel cells is contained in each electrode catalyst layer.

The catalyst for fuel cells is a catalyst for promoting oxygen reduction reaction in each electrode catalyst layer. The two electrode catalyst layers include a cathode-side (air electrode-side) catalyst layer and an anode-side (fuel electrode-side) catalyst layer. The catalyst for fuel cells promotes an oxygen reduction reaction (ORR) expressed by equation (1) below in the cathode-side catalyst layer and promotes a hydrogen oxidation reaction (HOR) expressed by equation (2) below in the anode-side catalyst layer.

$$4H^+ + O_2 + 4e^- \rightarrow 2H_2O \quad \text{Equation (1)}$$

$$H_2 \rightarrow 2H^+ + 2e^- \quad \text{Equation (2)}$$

The catalyst for fuel cells includes an oxygen (O) atom, a nitrogen (N) atom, a pentavalent phosphorus atom ($P^{5+}$), and a transition metal atom (M). The catalyst for fuel cells is represented by a chemical formula $MO_xN_yP_z$. The transition metal atom is at least one selected from the group consisting of a titanium (Ti) atom, a tantalum (Ta) atom, a niobium (Ni) atom, and a zirconium (Zr) atom. According to such a catalyst, by virtue of doping an oxide of a transition metal with N and $P^{5+}$, catalytic activity for oxygen reduction reaction is enabled to be exerted even in a composition in which a content of platinum is limited.

The transition metal element is preferably a Ti atom. The catalyst for fuel cells preferably satisfies requirement 1 below.

Requirement 1: The ratio ($N_P/N_{Ti}$) of the number of phosphorus atoms ($N_P$) to the number of Ti atoms ($N_{Ti}$) is 0.1 or more and 2.0 or less.

That is, the following expression is preferably satisfied in $TiO_xN_yP_z$.

$$0.1 \leq z \leq 2.0$$

This enhances catalytic activity for oxygen reduction reaction.

In addition, the catalyst for fuel cells preferably satisfies requirement 2 below.

Requirement 2: The ratio ($N_N/N_{Ti}$) of the number of nitrogen atoms ($N_N$) to the number of Ti atoms ($N_{Ti}$) is 0.8 or more and 1.5 or less.

That is, the following expression is preferably satisfied in $TiO_xN_yP_z$.

$$1.0 \leq y \leq 1.5$$

This enhances catalytic activity for oxygen reduction reaction.

The catalyst for fuel cells is formed of a core and a surface layer covering the core. The core includes a titanium nitride (TiN) lattice. The surface layer includes a titanium dioxide ($TiO_2$) lattice. The core and the surface layer both include $P^{5+}$. Catalytic activity for oxygen reduction reaction is enabled to be exerted thereby.

[Manufacturing Method of Catalyst for Fuel Cells]

A manufacturing method of the catalyst for fuel cells includes producing a dispersion liquid, heating the dispersion liquid, drying the dispersion liquid to produce powder, and pyrolyzing the produced powder to obtain a $TiO_xN_yP_z$ catalyst. In producing the dispersion liquid, powder of titanium oxysulfate ($TiOSO_4$) and phosphoric acid ($H_3PO_4$) are mixed to produce the dispersion liquid.

In manufacturing the catalyst for fuel cells, the ratio of the number of phosphorus atoms to the number of the titanium atoms used for manufacturing the catalyst is referred to as the phosphorus/titanium ratio $R_p$. That is, the phosphorus/titanium ratio $R_p$ is the ratio of the number of phosphorus atoms derived from phosphoric acid to the number of the titanium atoms derived from titanium oxysulfate. The phosphorus/titanium ratio $R_p$ preferably satisfies requirement 3 below.

Requirement 3: The phosphorus/titanium ratio $R_p$ is 0.2 or more and 0.5 or less.

In manufacturing the catalyst for fuel cells, when the phosphorus/titanium ratio $R_p$ satisfies requirement 3, a $TiO_xN_yP_z$ catalyst having enhanced ORR activity is obtained.

In the dispersion liquid production process of producing a dispersion liquid, powder of titanium oxysulfate (IV) and phosphoric acid may be mixed over several hours. In the heating process of heating the dispersion liquid, the dispersion liquid may be heated while stirring the dispersion liquid. In the pyrolysis process of pyrolyzing the powder produced in the powder production process, the powder can be pyrolyzed in an environment where nitrogen gas is supplied. In the pyrolysis process, a temperature at which the powder is pyrolyzed is preferably set to 973 K (700° C.) or higher and can be set to 1123 K (850° C.), for example. In the pyrolysis process, the amount of time during which the powder is pyrolyzed can be set to several hours, for example.

A post annealing process may be performed after the pyrolysis process. In the post annealing process, the $TiO_xN_yP_z$ catalyst obtained in the pyrolysis process is heated in an environment where ammonia ($NH_3$) gas is supplied. In the post annealing process, a temperature at which the $TiO_xN_yP_z$ catalyst is heated can be set to 923 K (650° C.), for example.

[Polymer Electrolyte Fuel Cell]

A structure of a polymer electrolyte fuel cell will be described with reference to FIG. 1. The structure described below is one example of the structure of the polymer electrolyte fuel cell. In addition, FIG. 1 illustrates a structure of a single cell included in the polymer electrolyte fuel cell. The polymer electrolyte fuel cell may have a structure in which multiple single cells are stacked on one another.

As illustrated in FIG. 1, the polymer electrolyte fuel cell 20 includes a membrane electrode assembly 10, two gas diffusion layers, and two separators. The polymer electrolyte fuel cell 20 includes a cathode 20C and an anode 20A. The membrane electrode assembly 10 includes a polymer electrolyte membrane 11, a cathode-side electrode catalyst layer 12C, and an anode-side electrode catalyst layer 12A. The polymer electrolyte membrane 11 is a solid state polymer electrolyte membrane. The cathode-side electrode catalyst layer 12C is bonded to one of the opposite faces in the polymer electrolyte membrane 11, and the anode-side electrode catalyst layer 12A is bonded to the other face. The cathode-side electrode catalyst layer 12C is an electrode catalyst layer composing a cathode (air electrode), and the anode-side electrode catalyst layer 12A is an electrode catalyst layer composing an anode (fuel electrode). Each of the electrode catalyst layers 12C, 12 A contains the above-described catalyst for fuel cells and a polymer electrolyte.

In the polymer electrolyte membrane 11, the face to which the cathode-side electrode catalyst layer 12C is bonded is a cathode face, and the face to which the anode-side electrode catalyst layer 12A is bonded is an anode face. A portion of the cathode face that is not covered with the cathode-side electrode catalyst layer 12C is an outer peripheral part. A cathode-side gasket 13C is located at the outer peripheral part. A portion of the anode face that is not covered with the anode-side electrode catalyst layer 12A is an outer peripheral part. An anode-side gasket 13A is located at the outer peripheral part. The cathode-side gasket 13C and the anode-side gasket 13A prevent gas from leaking from the outer peripheral parts of respective faces.

The two gas diffusion layers include a cathode-side gas diffusion layer 21C and an anode-side gas diffusion layer 21A. The two separators include a cathode-side separator 22C and an anode-side separator 22A.

The cathode-side gas diffusion layer 21C is in contact with the cathode-side electrode catalyst layer 12C. The cathode-side electrode catalyst layer 12C and the cathode-side gas diffusion layer 21C form the cathode (air electrode) 20C. The anode-side gas diffusion layer 21A is in contact with the anode-side electrode catalyst layer 12A. The anode-side electrode catalyst layer 12A and the anode-side gas diffusion layer 21A form the anode (fuel electrode) 20A.

A multilayer body composed of the membrane electrode assembly 10 and the two gas diffusion layers 21C, 21A is sandwiched between the cathode-side separator 22C and the anode-side separator 22A in the thickness direction of the polymer electrolyte fuel cell 20. The cathode-side separator 22C faces the cathode-side gas diffusion layer 21C. The anode-side separator 22A faces the anode-side gas diffusion layer 21A.

In the cathode-side separator 22C, each the opposite faces has multiple grooves. In the two faces, the grooves of the facing face that faces the cathode-side gas diffusion layer 21C form a gas flow passage 22Cg. In the two faces, the grooves of the face opposite to the facing face form a cooling water flow passage 22Cw. In the anode-side separator 22A, each of the opposite faces has multiple grooves. In the two faces, the grooves of the facing face that faces the anode-side gas diffusion layer 21A form a gas flow passage 22Ag. In the two faces, the grooves of the face opposite to the facing face form a cooling water flow passage 22Aw. Each of the separators 22C, 22A is formed from a material having conductivity and having low permeability to gas.

In the polymer electrolyte fuel cell 20, oxidizer gas is supplied to the cathode 20C through the gas flow passage 22Cg of the cathode-side separator 22C. Fuel gas is supplied to the anode 20A through the gas flow passage 22Ag of the anode-side separator 22A. This causes the polymer electrolyte fuel cell 20 to generate electric power. Air or oxygen gas can be used as the oxidizer gas, for example. Hydrogen gas can be used as the fuel gas, for example.

[Manufacturing Method of Membrane Electrode Assembly]

Hereinafter, a manufacturing method of the membrane electrode assembly will be described.

In manufacturing the membrane electrode assembly 10, the electrode catalyst layers 12A, 12C are separately formed on a substrate for transfer, and each of the electrode catalyst layers 12A, 12C is bonded to the polymer electrolyte membrane 11 by thermocompression bonding. Alternatively, the electrode catalyst layers 12A, 12C are respectively formed on the gas diffusion layers 21A, 21C, and each of the electrode catalyst layers 12A, 12C is bonded to the polymer electrolyte membrane 11 by thermocompression bonding. Alternatively, each of the electrode catalyst layers 12A, 12C is directly formed on the polymer electrolyte membrane 11.

In forming the electrode catalyst layers 12A, 12C, a catalyst ink for forming each of the electrode catalyst layers 12A, 12C is firstly prepared. Thereafter, the electrode catalyst layers 12A, 12C can be formed by applying the catalyst ink to a substrate or the like and drying the catalyst ink. In preparing the catalyst ink, a first catalyst ink is firstly prepared, and a second catalyst ink is subsequently prepared. The first catalyst ink includes a catalyst, a first polymer electrolyte, and a first solvent. The second catalyst ink includes a catalyst embedded body formed by the first catalyst ink, a conductive material, a second polymer electrolyte, and a second solvent.

After the first catalyst ink is prepared, the catalyst embedded body in which the catalyst is embedded in the first polymer electrolyte is produced by drying the first catalyst ink. Thereafter, the second catalyst ink is prepared using the produced catalyst embedded body.

In preparing the second catalyst ink, the catalyst embedded body and the conductive material are mixed to produce a mixture, and the mixture of the catalyst embedded body and the conductive material may be subsequently mixed without using any solvent. This enhances the proton conductivity at the surface of the catalyst, and increases the number of reaction active sites. In addition, in preparing the second catalyst ink, the mixture of the catalyst embedded body and the conductive material may be heated before mixing the mixture with the second solvent. This enhances contact properties between the catalyst embedded body and the conductive material, and increases the number of reaction active sites. In heating the mixture, the mixture is preferably heated at a temperature falling within the range of 50° C. or higher and 180° C. or lower. This allows the second catalyst ink to be prepared without dissolving the first polymer electrolyte contained in the mixture in the solvent and without inhibiting the proton conductivity.

In preparing the second catalyst ink, when the mixture of the catalyst embedded body and the conductive material is dissolved in the solvent, the second polymer electrolyte may be dissolved in the solvent together with the mixture, or the second polymer electrolyte may be dissolved in the solvent at a timing different from that of the mixture.

An electrolyte of a polymer having proton conductivity can be used for the first polymer electrolyte and the second polymer electrolyte. The first polymer electrolyte and the second polymer electrolyte are preferably an electrolyte the same as or similar to that of the polymer electrolyte membrane 11 from the viewpoint of enhancing adhesiveness between the electrode catalyst layers 12A, 12C and the polymer electrolyte membrane 11. Fluororesin and hydrocarbon resin can be used for the first polymer electrolyte and the second polymer electrolyte, for example. Nafion® (manufactured by DuPont de Nemours, Inc.) or the like can be used as the fluororesin, for example. Sulfonated polyether ketone, sulfonated polyether sulfone, sulfonated polyether ether sulfone, sulfonated polysulfide, and sulfonated polyphenylene can be used as the hydrocarbon resin, for example.

Carbon particles can be used as the conductive material, for example. The conductive material may be any particulate material that has conductivity, and is unlikely to be eroded by the catalyst. Carbon black, graphite, black lead, activated carbon, carbon fibers, carbon nanotubes, and fullerene can be used as the conductive material. A specific surface area of the conductive material may be larger than a specific surface area of the catalyst.

A liquid in which the polymer electrolyte can be dispersed or a liquid in which the polymer electrolyte can be dissolved is preferably used as the first solvent and the second solvent, for example. Water, alcohols, ketones, ethers, sulfoxides, and amides can be used as the solvent. Alcohols include methanol, ethanol, 1-propanol, 2-propanol, 1-butanol, 2-butanol, pentanol, ethylene glycol, diacetone alcohol, and 1-methoxy-2-propanol. Ketones include acetone, methyl ethyl ketone, pentanone, methyl isobutyl ketone, and diisobutyl ketone. Ethers include dioxane and tetrahydrofuran. Sulfoxides include dimethyl sulfoxide. Amides include dimethyl formamide and dimethyl acetamide. The above-described solvents may be used singly or in combinations of two or more thereof as the first solvent and the second solvent. It is preferable that the first solvent and the second solvent are easily removed by heat.

In preparing the first catalyst ink and preparing the second catalyst ink, the solvent to which the catalyst and others are added may be subjected to dispersion treatment. A ball mill, a bead mill, a roll mill, a shearing mill, a wet mill, an ultrasonic dispersing device, and a homogenizer can be used for dispersion treatment, for example.

A roll coater, an air knife coater, a blade coater, a rod coater, a reverse coater, a bar coater, a comma coater, a die coater, a gravure coater, a screen coater, a spray, and a spinner can be used for applying the second catalyst ink, for example.

A method of drying the first catalyst ink and a method of drying the second catalyst ink may be hot air drying and infrared rays (IR) drying. In drying the first catalyst ink and the second catalyst ink, only one of or both of hot air drying and IR drying may be used. When the first catalyst ink is dried to produce the catalyst embedded body, the first catalyst ink is preferably dried at a temperature falling within the range of 30° C. or higher and 140° C. or lower. Consequently, the first polymer electrolyte included in the catalyst embedded body is not dissolved in the solvent during the process of preparing the second catalyst ink, and decrease of the proton conductivity at the surface of the catalyst is limited.

In the catalyst embedded body, the ratio (C:P) between the mass (C) of the catalyst and the mass (P) of the first polymer electrolyte preferably falls within the range of 1:0.01 to 1:30. That is, in the catalyst embedded body, the ratio (P/C) of the mass (P) of the first polymer electrolyte to the mass (C) of the catalyst preferably falls within the range of 0.01 or more and 30 or less. This enhances the proton conductivity at the catalyst surface without inhibiting disperse properties of oxygen and the like, and increases the number of active reaction sites.

When the substrate for transfer is used, a substrate provided with an electrode catalyst layer is produced by applying the second catalyst ink on the substrate for transfer and subsequently drying the second catalyst ink. Thereafter, the electrode catalyst layers 12A, 12C and the polymer electrolyte membrane 11 are bonded by applying heat and pressure to the electrode catalyst layers 12A, 12C and the polymer electrolyte membrane 11 in a state where the surfaces of the electrode catalyst layers 12A, 12C on the respective substrates provided with the electrode catalyst layers are brought into contact with the polymer electrolyte membrane 11, for example. The membrane electrode assembly 10 can be manufactured by bonding the anode-side electrode catalyst layer 12A to one face of the polymer electrolyte membrane 11 and bonding the cathode-side electrode catalyst layer 12C to the other face of the polymer electrolyte membrane 11.

The substrate for transfer may be any substrate satisfying the following: the second catalyst ink can be applied to at least one face thereof; the second catalyst ink can be dried by heat; and the electrode catalyst layers 12A, 12C can be transferred to the polymer electrolyte membrane 11. The substrate for transfer may include a polymer film or a fluororesin film having heat resistance, for example. A polymer forming the polymer film may be polyethylene terephthalate, polyamide, polyimide, polystyrene, polysulfone, polyether sulfone, polyphenylene sulfide, polyether ether ketone, polyetherimide, polybenzimidazole, polyamide-imide, polyacrylate, polyethylene naphthalate, or polyparabanic acid aramid, for example. Resin for forming the fluororesin film may be polytetrafluoroethylene, polychlorotrifluoroethylene, polyvinylidene fluoride, an ethylene-tetrafluoroethylene copolymer, a tetrafluoroethylene-hexafluoropropylene copolymer, a tetrafluoro perfluoroalkyl vinyl ether copolymer, or the like.

The substrate for transfer may be a substrate obtained by subjecting the surface of the above-described polymer film or fluororesin film to mold-release treatment or a substrate obtained by integrally molding the above-described film and a release layer through coextrusion or the like.

The substrate for transfer may have a single layer structure or may have a multilayer structure. When the substrate for transfer has a multilayer structure, the layer located at the outermost surface may have an opening. The opening is a portion from which a part of the layer has been removed by cutting and punching or the like. In addition, the electrode catalyst layers 12A, 12C obtained by drying the second catalyst ink may have a shape corresponding to the opening.

When the electrode catalyst layers 12A, 12C are directly formed on the polymer electrolyte membrane 11, the electrode catalyst layers 12A, 12C are formed by applying the second catalyst ink to the surface of the polymer electrolyte membrane 11 and subsequently removing the solvent from the second catalyst ink, for example. The method in which the electrode catalyst layers 12A, 12C are directly formed on the polymer electrolyte membrane 11 is preferable because adhesiveness between the polymer electrolyte membrane 11 and the electrode catalyst layers 12A, 12C is high, and the electrode catalyst layers 12A, 12C are free from collapse due to thermocompression bonding.

As described above, when the polymer electrolyte fuel cell 20 includes the gaskets 13A, 13C, the gaskets 13A, 13C are arranged at the portions that are not covered with the electrode catalyst layers 12A, 12C in the polymer electrolyte membrane 11. The gaskets 13A, 13C simply need to satisfy the following: an adhesive material can be applied or bonded to at least one face thereof; and the gaskets 13A, 13C can be bonded to the polymer electrolyte membrane 11. The above-described material for forming the substrate for transfer can be used as a material for forming the gaskets 13A, 13C. The average thickness value of each of the gaskets 13A, 13C is preferably 1 μm or more and 500 μm or less, more preferably 3 μm or more and 200 μm or less, and still more preferably 5 μm or more and 100 μm or less.

The average thickness value of a single polymer electrolyte membrane 11 is preferably 1 μm or more and 500 μm or less, more preferably 3 µm or more and 200 µm or less, and still more preferably 5 µm or more and 100 µm or less.

Since the catalyst for fuel cells is embedded in the first polymer electrolyte, the manufacturing method described above enhances the proton conductivity at the surface of the catalyst. Especially, when the specific surface area of the catalyst for fuel cells is smaller than the specific surface area of the conductive material, since the catalyst for fuel cells having a specific surface area smaller than the specific surface area of the conductive material is embedded in the first polymer electrolyte, the effect of enhancing the proton conductivity at the surface of the catalyst is more pronounced. As a consequence, the number of reaction active sites in the electrode catalyst layers is increased. On the other hand, when the catalyst for fuel cells is not embedded in the first polymer electrolyte at the time of preparing the first catalyst ink, since the conductive material having a larger specific surface area is preferentially embedded in the first polymer electrolyte at the time of forming the electrode catalyst layers, the proton conductivity at the surface of the catalyst is hard to enhance; consequently, the number of reaction active sites is hard to increase. Such a method enhances the proton conductivity at the surface of the catalyst by increasing the concentration of the first polymer electrolyte. However, it is difficult to improve output performance because the first polymer electrolyte is supplied in an excessive amount to the conductive material.

EXAMPLES

Examples and Comparative Examples will be described with reference to FIGS. 2 to 13.

Example 1

Titanium oxysulfate (IV) powder and phosphoric acid ($H_3PO_4$) were mixed in distilled water and stirred for two hours to produce a dispersion liquid. At this time, the ratio (phosphorus/titanium ratio $R_p$) of phosphorus atoms derived from phosphoric acid to titanium atoms derived from titanium oxysulfate (IV) was set to 0.2. Urea powder and hydrochloric acid (HCl) were added to the dispersion liquid at room temperature. At this time, the ratio of the mass of urea to the mass of titanium oxide derived from titanium oxysulfate was set to 100. In addition, the concentration of hydrochloric acid was set to 1.0 mol/dm$^3$. The dispersion liquid was heated while being stirred, and the dispersion liquid was subsequently dried to obtain powder. The powder obtained by drying was heated at 1123 K (850° C.) for two hours in an environment where nitrogen gas was supplied. In this manner, a $TiO_xN_yP_z$ catalyst of Example 1 was obtained.

Example 2

A catalyst for fuel cells of Example 2 was obtained by the same method as in Example 1 except that the phosphorus/titanium ratio $R_p$ was changed to 0.35 in Example 2.

Example 3

A catalyst for fuel cells of Example 3 was obtained by the same method as in Example 1 except that the phosphorus/titanium ratio $R_p$ was changed to 0.5 in Example 3.

Example 4

A catalyst for fuel cells of Example 4 was obtained by the same method as in Example 1 except that the phosphorus/titanium ratio $R_p$ was changed to 1.0 in Example 4.

Example 5

A catalyst for fuel cells of Example 5 was obtained by the same method as in Example 2 except that the $TiO_xN_yP_z$ catalyst obtained in Example 5 was heated at 923 K (650° C.) for three hours in an environment where ammonia ($NH_3$) gas was supplied.

Comparative Example 1

A catalyst for fuel cells of Comparative Example 1 was obtained by the same method as in Example 1 except that no phosphoric acid was used in Comparative Example 1.

Comparative Example 2

A catalyst for fuel cells of Comparative Example 2 was obtained by heating titanium dioxide ($TiO_2$) powder at 1123 K (850° C.) for three hours in an environment where ammonia gas was supplied.

[X-Ray Diffraction Spectra and Raman Spectra]

X-ray diffraction spectra and Raman spectra respectively obtained by X-ray diffraction spectroscopy and Raman spectroscopy performed on the catalyst for fuel cells of Example 1 to Example 4 and Comparative Example 1 will be described with reference to FIGS. 2 and 3.

The core of the catalyst for fuel cells of each of Example 1 to Example 4 and Comparative Example 1 was analyzed using an X-ray diffraction spectrometer (MiniFlex600 manufactured by Rigaku Corporation). X-ray diffraction spectra shown in FIG. 2 were obtained as a result of X-ray diffraction spectroscopy performed on the core of each catalyst for fuel cells.

Figure 2:
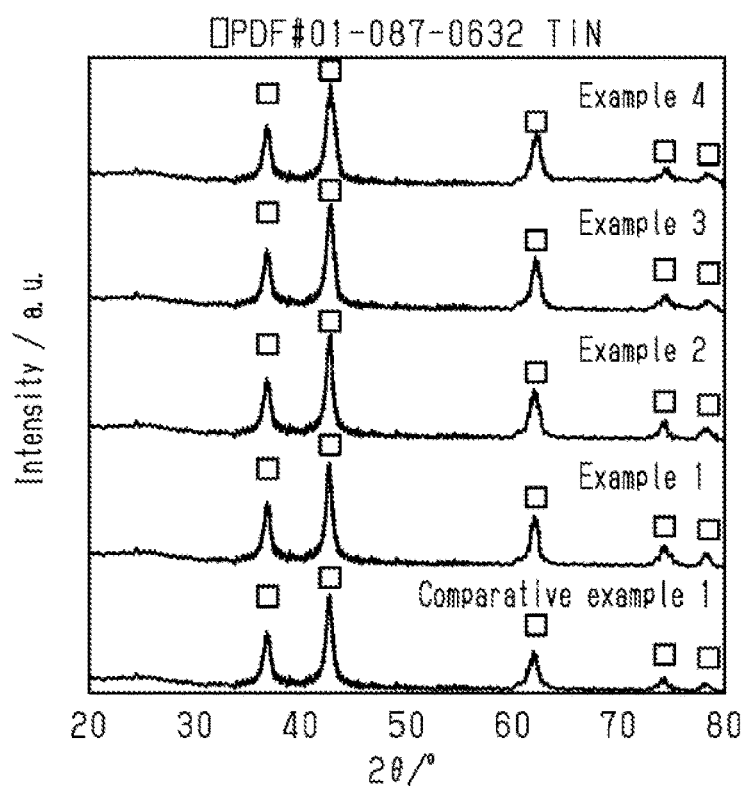
FIG. 2 shows X-ray diffraction spectra obtained by X-ray diffraction spectroscopy performed on catalysts for fuel cells of Example 1 to Example 4 and Comparative Example 1.

As shown in FIG. 2, in all of the catalyst for fuel cells, it was observed that the core was formed of TiN alone. On the other hand, no peaks originating from phosphorus compounds could be observed in the X-ray diffraction spectrum of the core of each catalyst for fuel cells. Examples of the phosphorus compounds include TiP, $TiP_2O_7$, and $P_3N_5$.

As no peaks originating from the phosphorus compounds described above were observed in the X-ray diffraction spectra, it can be said that phosphorus species were not segregated from phosphoric acid, which was a precursor, during the pyrolysis process of powder, and no phosphorus compound was produced.

In addition, from the X-ray diffraction spectra in Example 1 to Example 4, it was observed that the peak width did not broaden even when the phosphorus/titanium ratio $R_p$ increased. From these results, it can be said that the crystallite size of TiN does not decrease with increase of the phosphorus/titanium ratio $R_p$. In other words, the crystallite size of TiN does not depend on the phosphorus/titanium ratio $R_p$.

As described above, the heating temperature in the pyrolysis process was set to 1123 K when the catalyst for fuel cells of Example 1 to Example 4 were manufactured. Consequently, a large amount of reactive gas was evolved mainly from $NH_4Cl$ during the pyrolysis process for producing TiN, which is thought to be the reason why the size of the TiN crystal in the produced $TiO_xN_yP_z$ did not depend on the phosphorus/titanium ratio $R_p$. With respect to the catalyst for fuel cells of Example 5, an X-ray diffraction spectrum having the same trend as in Example 1 to Example 4 was also observed.

The surface layer of the catalyst for fuel cells of each of Example 1 to Example 4 and Comparative Example 1 was analyzed using a Raman spectrometer (NRS-5100, manufactured by JASCO Corporation). As a result of Raman spectroscopy performed on the surface layer of each catalyst for fuel cells, the Raman spectra shown in FIG. 3 were obtained.

Figure 3:
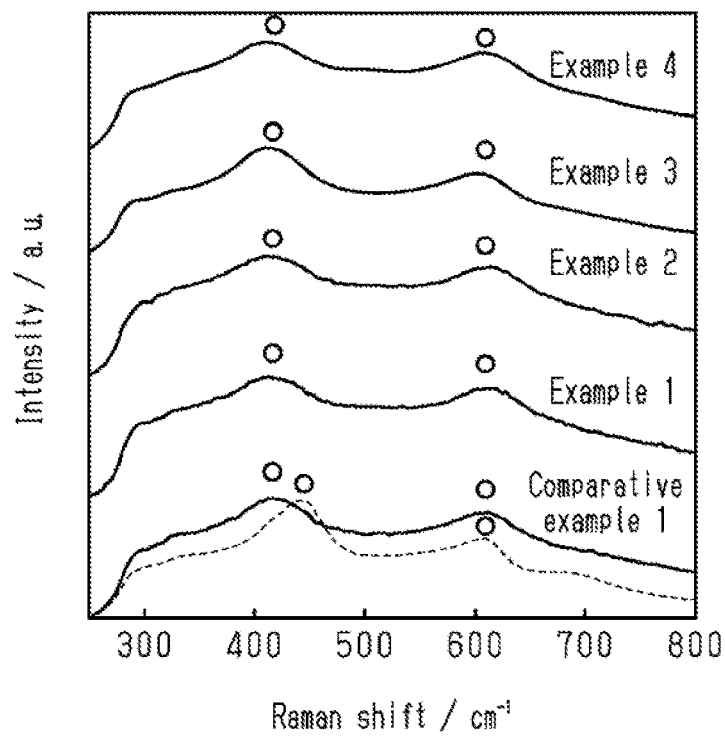
FIG. 3 shows Raman spectra obtained by Raman spectroscopy performed on the catalysts for fuel cells of Example 1 to Example 4 and Comparative Example 1.

The broken line in FIG. 3 is a Raman spectrum obtained by Raman spectroscopy performed on purchased rutile $TiO_2$ powder. It was observed that the Raman spectrum had peaks at 443 $cm^{-1}$ and 606 $cm^{-1}$. Among these peaks, the peak at 443 $cm^{-1}$ is a peak assigned to the $E_g$ vibration mode in stoichiometric rutile $TiO_2$, and the peak at 606 $cm^{-1}$ is a peak assigned to the $A_{1g}$ vibration mode in stoichiometric rutile $TiO_2$.

In the Raman spectrum of Comparative Example 1, it was observed that the peak at 443 $cm^{-1}$, that is, the peak assigned to the $E_g$ vibration mode shifted to a lower wave number as compared to the Raman spectrum of $TiO_2$ powder. Such a result indicates that oxygen vacancies were incorporated into the surface layer of rutile $TiO_2$ by nitrogen doping. In addition, it was observed that the Raman spectrum of the $TiO_xN_y$ catalyst, which was the catalyst for fuel cells of Comparative Example 1, had broader peaks as compared to the Raman spectrum of $TiO_2$ powder. Such a result also indicates oxygen vacancies were incorporated into the surface layer of $TiO_2$ by nitrogen doping as in the result described above.

As is clear from the Raman spectra corresponding to Example 1 to Example 4, respectively, even when the phosphorus/titanium ratio $R_p$ increased, neither a new peak nor a further peak shift was observed in the Raman spectra. From these results, it can be said that even when the phosphorus/titanium ratio $R_p$ increases, the amount of oxygen vacancies on rutile $TiO_2$ forming the surface layer is retained.

[X-Ray Photoelectron Spectra]

The chemical bonding states at the surface layer of the catalyst for fuel cells of each of Example 1 to Example 5 and Comparative Example 1 were analyzed using a photoelectron spectrometer (PHI5000 VersaProbe, manufactured by ULVAC-PHI, Inc.). As a result of X-ray photoelectron spectroscopy performed on each catalyst for fuel cells, the X-ray photoelectron spectra shown in FIGS. 4A to 9D were obtained. Ti 2p spectrum, O 1s spectrum, N is spectrum, and P 2p spectrum for each catalyst for fuel cells were obtained. In addition, in each figure, A is the Ti 2p spectrum, B is the O 1s is spectrum, C is the N is spectrum, and D is the P 2p spectrum.

In each figure, the solid line is the X-ray photoelectron spectrum, and the thick dashed line is a background obtained by Shirley method. In FIGS. 4A, 5A, 6A, 7A, 8A, and 9A, the broken line shows peaks of TiN, the long-dash short-dash line shows peaks of N-doped $TiO_2$, and the long-dash double-short-dash line shows peaks of $TiO_2$. In FIGS. 4B, 5B, 6B, 7B, 8B, and 9B, the broken line shows a peak of O—Ti—O in $TiO_2$, the long-dash short-dash line shows a peak of oxygen vacancies in $TiO_2$, that is, a peak of O—Ti—N, and the long-dash double-short-dash line shows a peak of O—P—O in $TiO_2$ containing substitutional P. In FIGS. 4C, 5C, 6C, 7C, 8C, and 9C, the broken line shows a peak of N—Ti/P—N in TiN, the long-dash short-dash line is a peak of N—Ti/P—N(substitutional) in $TiO_2$, the long-dash double-short-dash line shows a peak of O—Ti/P—N (substitutional) in $TiO_2$, and the thin line shows a peak of Ti/P—O—N(interstitial) in $TiO_2$. In FIGS. 4D, 5D, 6D, 7D, 8D, and 9D, the broken line shows a peak of $P^{5+}$.

FIGS. 4A to 4D show X-ray photoelectron spectra of the catalyst for fuel cells of Comparative Example 1.

Figure 4A:
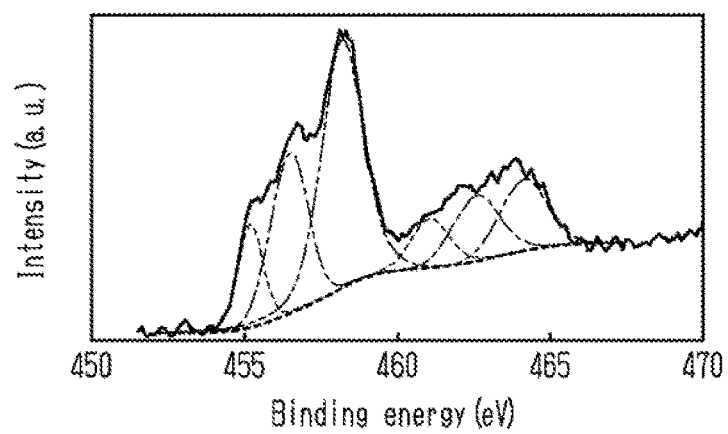
FIGS. 4A to 4D show photoelectron spectra obtained by X-ray photoelectron spectroscopy performed on the catalyst for fuel cells of Comparative Example 1.

As shown in FIG. 4A, the Ti 2p spectrum split into Ti $2p_{3/2}$ and Ti $2p_{1/2}$ via spin-orbit coupling and displayed a doublet. In Comparative Example 1 in which the catalyst was not doped with phosphorus, it was observed that the main peak in the Ti $2p_{3/2}$ region was located at 458.3 eV. Such results indicate that the valency of Ti located at the surface is mostly 4+ and that TiN located at the surface is oxidized. These results are in good agreement with the results obtained from X-ray diffraction spectroscopy and Raman spectroscopy. In addition, the shoulder peak located at 456 eV to 457 eV in the Ti 2p spectrum indicates the formation of $TiO_xN_y$.

Figure 4B:
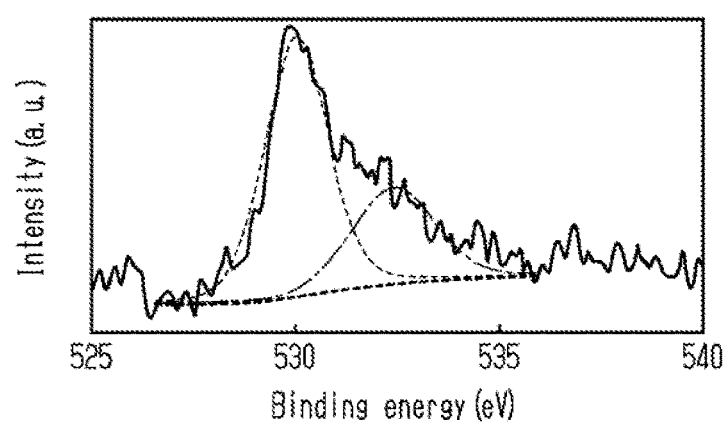
Figure 4C:
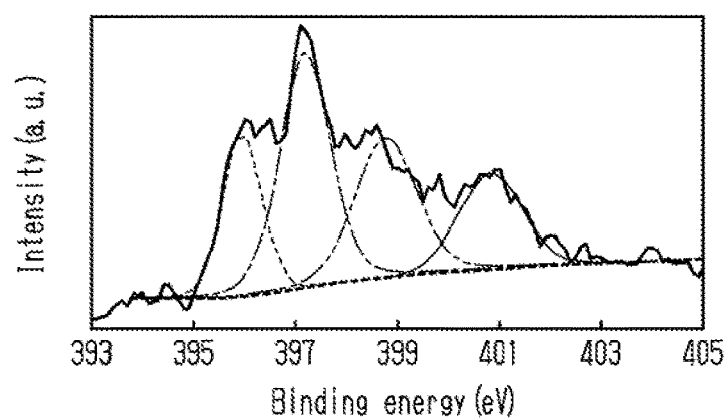
Figure 4D:
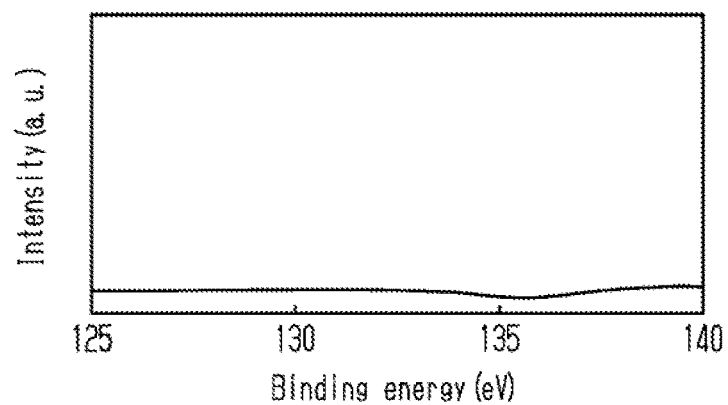

As shown in FIG. 4C, as the N is spectrum has a peak located at 397 eV and a peak located at 399 eV, it was observed that most nitrogen atoms substituted oxygen atoms in the lattice in $TiO_2$.

$TiO_2$ doped with nitrogen atoms substituting the oxygen atoms in $TiO_2$ was also observed from the O 1s spectrum shown in FIG. 4B. That is, as shown in FIG. 4B, the main peak located at 530 eV in the O 1s spectrum corresponds to oxygen in the $TiO_2$ lattice. The shoulder peak located at 532 eV in the O 1s spectrum corresponds to oxygen vacancies on the $TiO_2$ lattice formed by doping of nitrogen atoms substituting oxygen atoms.

FIGS. 5A to 5D show X-ray photoelectron spectra of the catalyst for fuel cells of Example 1.

Figure 5A:
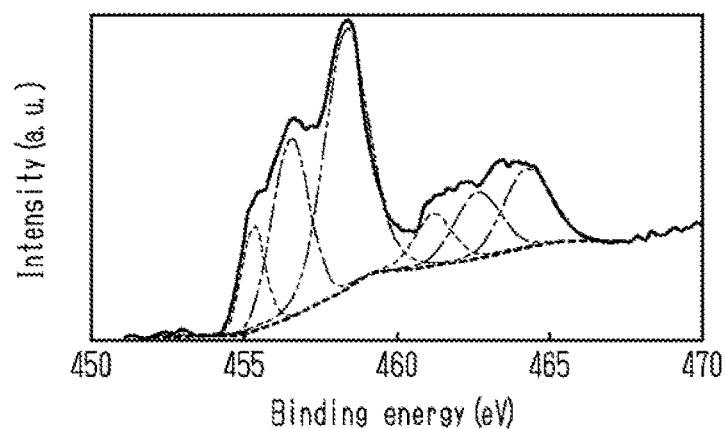
FIGS. 5A to 5D show photoelectron spectra obtained by X-ray photoelectron spectroscopy performed on the catalyst for fuel cells of Example 1.
Figure 5B:
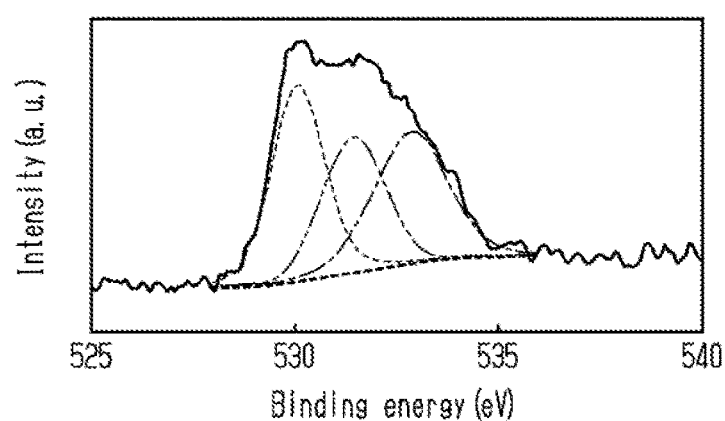
Figure 5C:
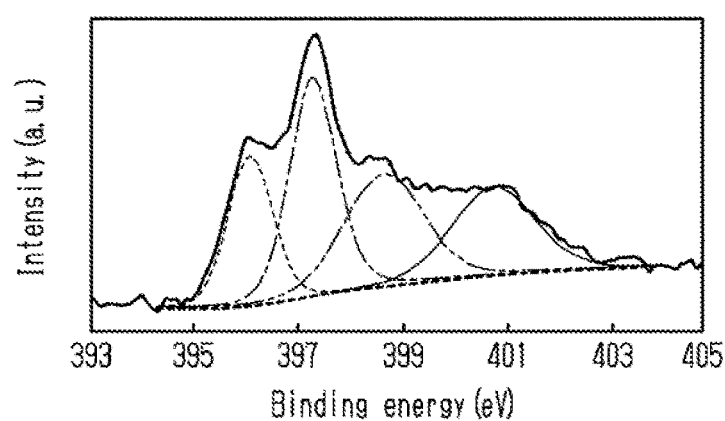

As is clear from the Ti 2p spectrum shown in FIG. 5A and the N 1s spectrum shown in FIG. 5C, it was observed that by virtue of setting the phosphorus/titanium ratio $R_p$ at 0.2, both the Ti 2p spectrum and the N 1s spectrum did not significantly change even when $TiO_xN_y$ is doped with phosphorus.

On the other hand, it was observed that a peak located at 531 eV appeared in the O 1s spectrum shown in FIG. 5B. This peak is assigned to O—P—O bonding in phosphorus-doped $TiO_2$.

Figure 5D:
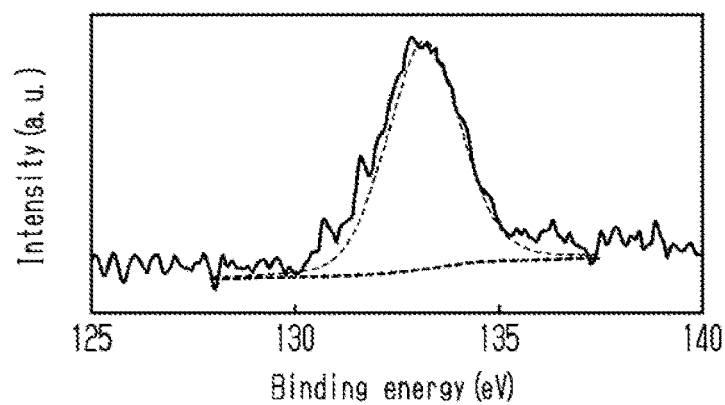
Figure 6A:
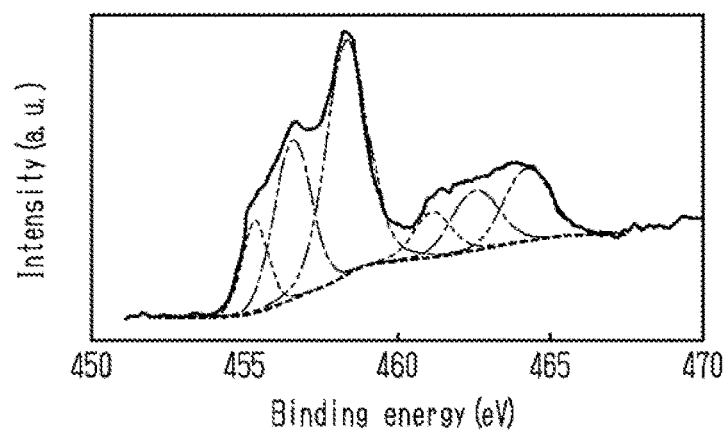
FIGS. 6A to 6D show photoelectron spectra obtained by X-ray photoelectron spectroscopy performed on the catalyst for fuel cells of Example 2.
Figure 6B:
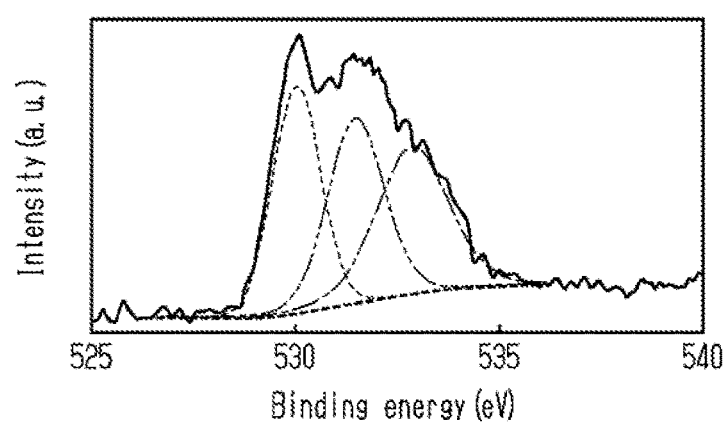
Figure 6C:
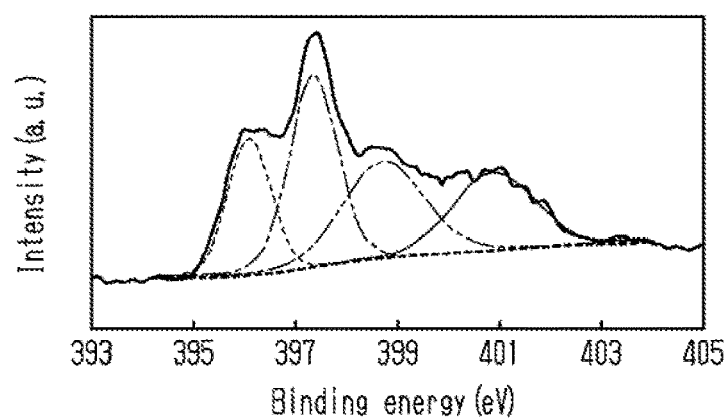
Figure 6D:
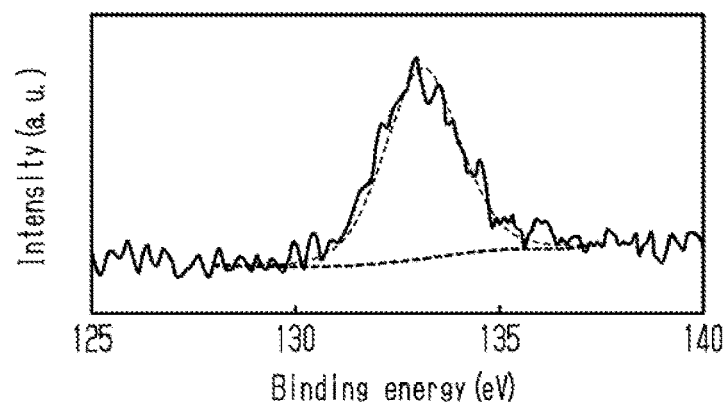
Figure 7A:
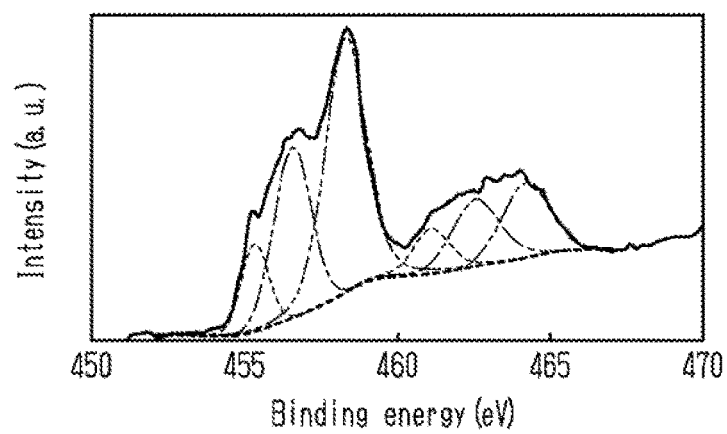
FIGS. 7A to 7D show photoelectron spectra obtained by X-ray photoelectron spectroscopy performed on the catalyst for fuel cells of Example 3.
Figure 7B:
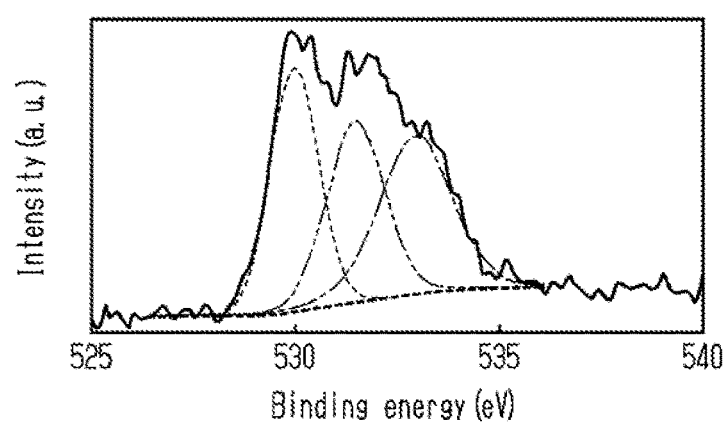
Figure 7C:
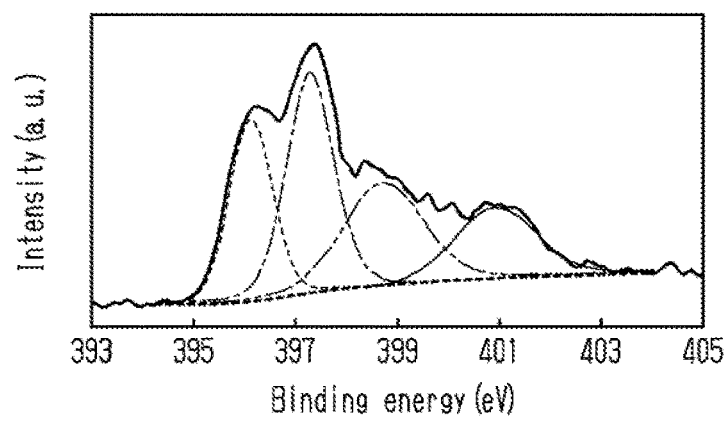
Figure 7D:
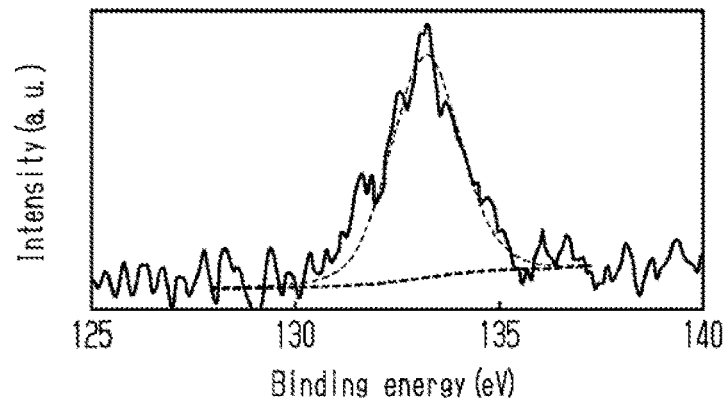
Figure 8A:
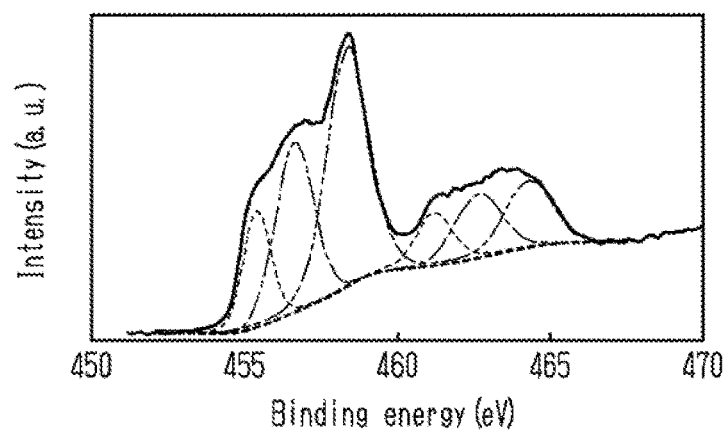
FIGS. 8A to 8D show photoelectron spectra obtained by X-ray photoelectron spectroscopy performed on the catalyst for fuel cells of Example 4.
Figure 8B:
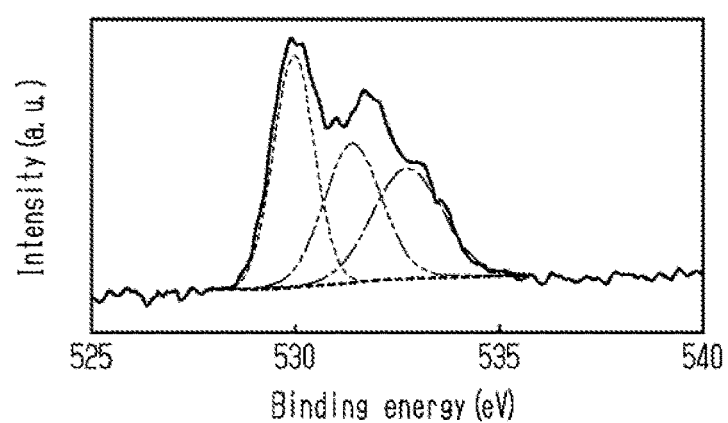
Figure 8C:
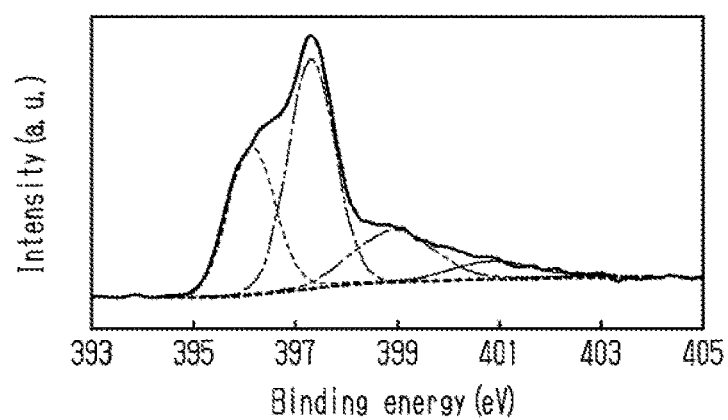
Figure 8D:
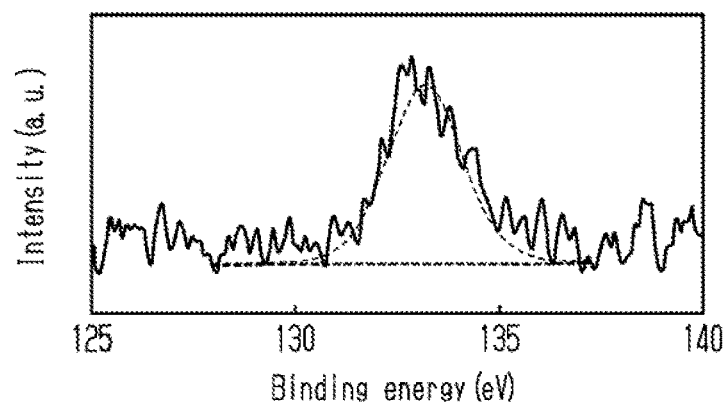
Figure 9A:
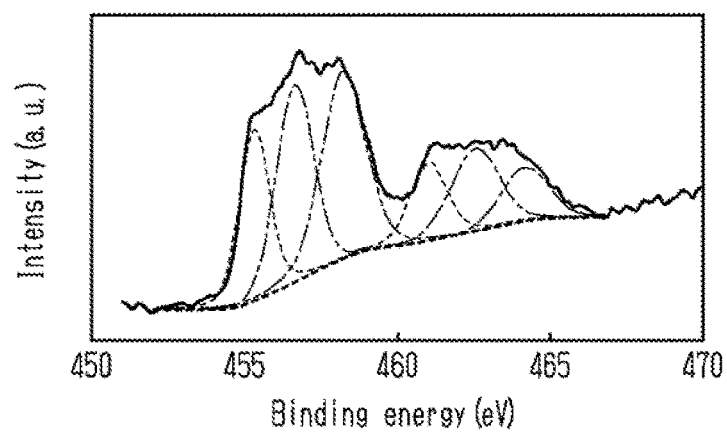
FIGS. 9A to 9D show photoelectron spectra obtained by X-ray photoelectron spectroscopy performed on the catalyst for fuel cells of Example 5.
Figure 9B:
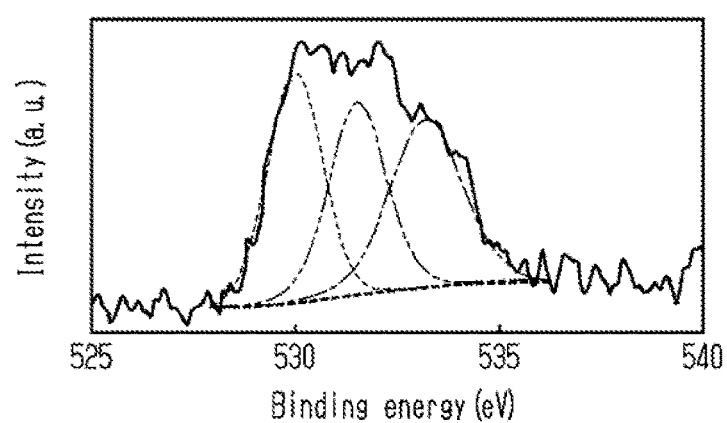
Figure 9C:
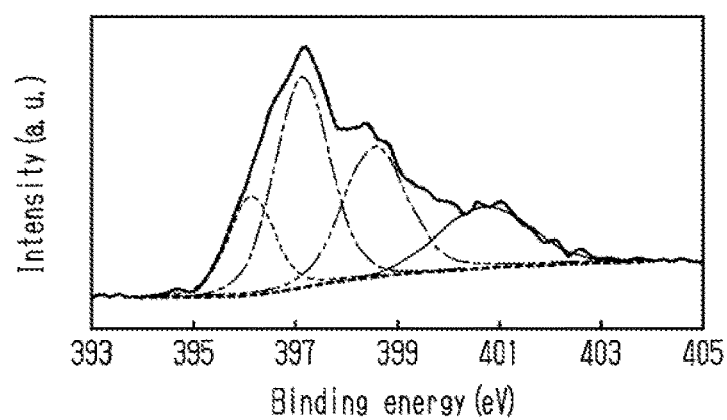
Figure 9D:
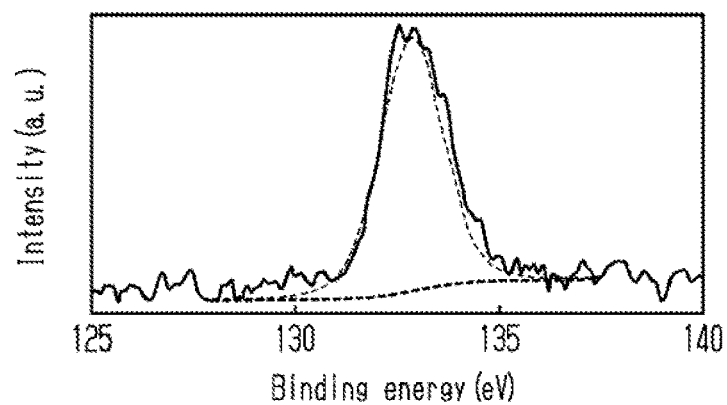

In addition, as shown in FIG. 5D, the peak located at 133 eV appearing in the P 2p spectrum corresponds to cationic $P^{5+}$ substituting titanium atoms in phosphorus-doped $TiO_2$ and in phosphorus and nitrogen co-doped $TiO_2$. The spectrum of FIG. 5B and the spectrum of FIG. 5D indicate that phosphorus atoms substituted titanium atoms in the $TiO_2$ lattice of the surface layer. Since no peak located at 129 eV, which corresponds to anionic $P^{3-}$, was observed in the spectrum shown in FIG. 5D, it can be said that the surface layer of the catalyst for fuel cells is free from Ti—P bonds.

From the spectra shown in FIGS. 4 and 5, it was observed that the valency of titanium atoms contained in the surface layer is mostly 4+. In addition, it was observed that the chemical bonding states of both titanium atoms and nitrogen atoms did not change by doping the catalyst for fuel cells with phosphorus atoms.

The valency of phosphorus atoms in a part located deeper than the surface of the catalyst for fuel cells was analyzed by $Ar^+$ beam sputtering against the catalyst for fuel cells. At this time, sputtering with an acceleration voltage set to 500 V and sputtering with an acceleration voltage set to 1 kV were performed. When the surface of the catalyst was subjected to sputtering for five minutes in a state where the acceleration voltage was set to 500 V, no $P^{3-}$ peak appeared in the P 2p spectrum. On the other hand, in the Ti 2p spectrum, it was observed that the peak of TiN located at 455 eV increased as the sputtering time increased. Such a trend was also observed in the case where a deeper part in the core of the catalyst was subjected to sputtering by increasing the acceleration voltage to 1 kV. These results indicate that most P$^+$ formed solid solutions with both TiN in the core and rutile TiO$_2$ in the surface layer.

FIGS. 6A to 6D show X-ray photoelectron spectra of the catalyst for fuel cells of Example 2, and FIGS. 7A to 7D show X-ray photoelectron spectra of the catalyst for fuel cells of Example 3. FIGS. 8A to 8D show X-ray photoelectron spectra of the catalyst for fuel cells of Example 4, and FIGS. 9A to 9D show X-ray photoelectron spectra of the catalyst for fuel cells of Example 5. Each of the spectra shown in FIGS. 6A to 9D has the same trend as that of the corresponding spectrum shown in FIGS. 5A to 5D. Therefore, the matters found from the comparison between FIGS. 4A to 4D and FIGS. 5A to 5D are also found from each of the comparison between FIGS. 4A to 4D and FIGS. 6A to 6D, comparison between FIGS. 4A to 4D and FIGS. 7A to 7D, comparison between FIGS. 4A to 4D and FIGS. 8A to 8D, and comparison between FIGS. 4A to 4D and FIGS. 9A to 9D.

[Peak Area Fraction in X-Ray Photoelectron Spectrum]

Figure 10:
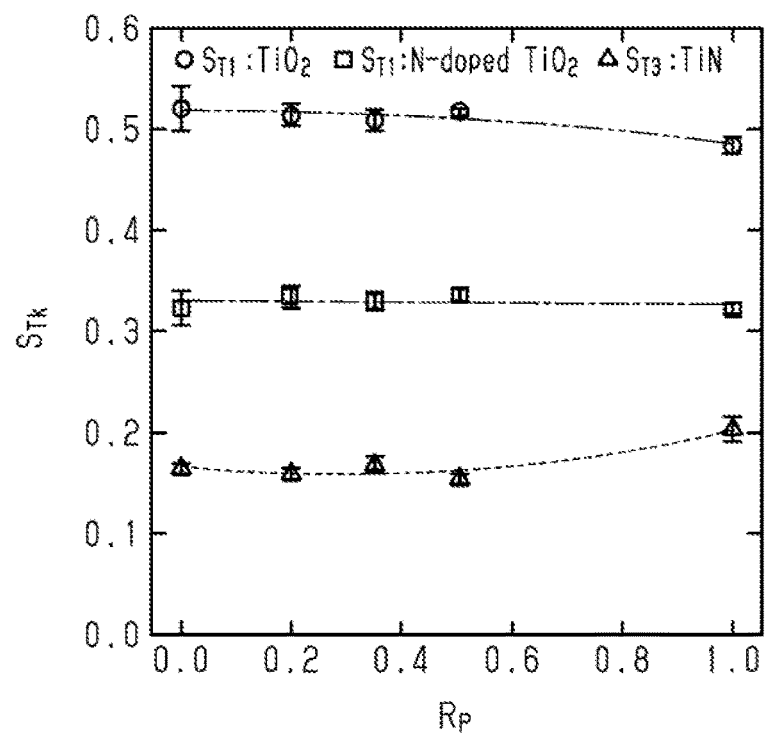
FIG. 10 is a graph showing the relationship between area fractions of respective peaks in Ti 2p spectra and phosphor/titanium ratios.
Figure 11:
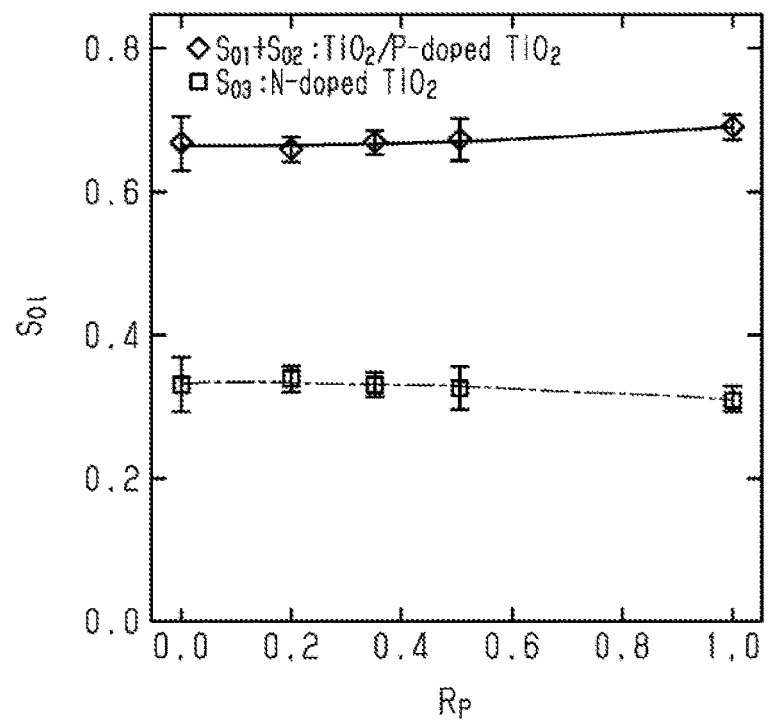
FIG. 11 is a graph showing the relationship between area fractions of respective peaks in O 1s spectra and phosphorus/titanium ratios.
Figure 12:
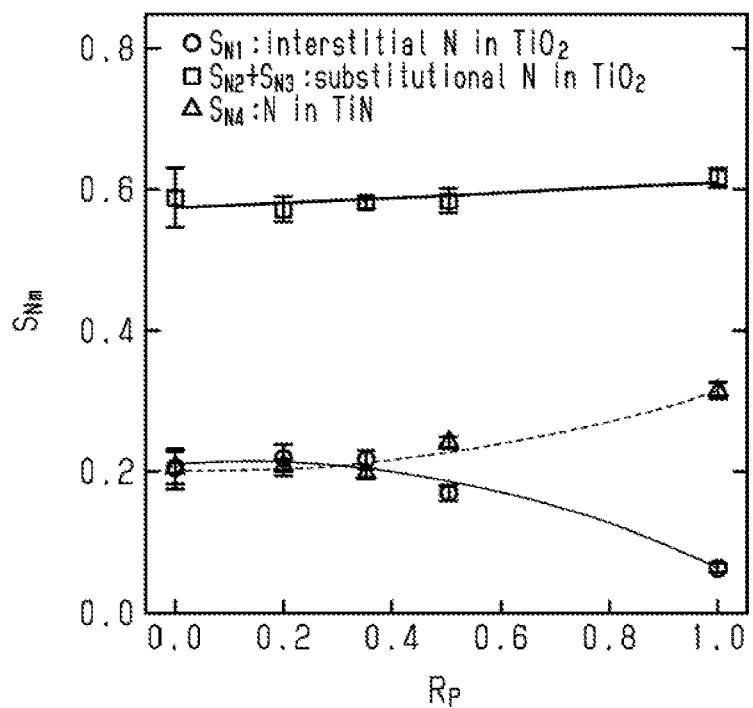
FIG. 12 is a graph showing the relationship between area fractions of respective peaks in N 1s spectra and phosphorus/titanium ratios.

FIGS. 10 to 12 are graphs based on the X-ray photoelectron spectra shown in FIGS. 4A to 9D. FIG. 10 shows the relationship between the area fractions of respective peaks in the Ti 2p spectra and phosphorus/titanium ratios $R_p$. FIG. 11 shows the relationship between the area fractions of respective peaks in the O 1s spectra and phosphorus/titanium ratios $R_p$. FIG. 12 shows the relationship between the area fractions of respective peaks in the N 1s spectra and phosphorus/titanium ratios $R_p$.

As shown in FIG. 11, in the O 1s spectra, it was observed that even when the phosphorus/titanium ratio $R_p$ changed, the area fraction ($S_{O3}$) of the peak located at 532 eV that originates from oxygen vacancies did not change. This result is in good agreement with the trend obtained from the Raman spectra described with reference to FIG. 2. From these results, it can be said that the charge imbalance due to doped P$^{5+}$ is compensated by titanium atom vacancies.

As shown in FIGS. 10 to 12, it was observed that even when the phosphorus/titanium ratio $R_p$ increased to 0.5, the area fraction of each peak almost unchanged. Such a result is clear from the X-ray photoelectron spectra shown in FIGS. 5A to 7D the shapes of which remained almost the same even when the phosphorus/titanium ratio $R_p$ increased to 0.5.

Meanwhile, as shown in FIG. 10, when the phosphorus/titanium ratio $R_p$ increased to 1.0, it was observed, in the Ti 2p spectra, that the area fraction ($S_{T3}$) of the peak originating from TiN increased, and the area fraction ($S_{T1}$) of the peak originating from TiO$_2$ decreased. Such a trend is in good agreement with the following results in the spectra shown in FIG. 12. That is, it was observed that as the phosphorus/titanium ratio $R_p$ increased from 0.5 to 1.0, the area fraction ($S_{N4}$) of TiN increased. On the other hand, it was observed that as the phosphorus/titanium ratio $R_p$ increased from 0.5 to 1.0, the area fraction ($S_{N1}$) of interstitial nitrogen atoms in TiO$_2$ decreased.

When the phosphorus/titanium ratio $R_p$ was 1.0, more byproducts attached to the inner wall of a quartz tube after pyrolysis as compared to the case where the phosphorus/titanium ratio $R_p$ was 0.5.

These results indicate that in the case where the phosphorus/titanium ratio $R_p$ was 1.0, excess phosphoric acid reacted with another precursor during the mixing and pyrolysis processes to change the chemical bonding states of TiO$_x$N$_y$P$_z$. That is, these results indicate that the interstitial nitrogen atoms in the TiO$_2$ lattice were less stable as compared to substituted nitrogen atoms, and the content of the interstitial nitrogen atoms in the TiO$_2$ lattice decreased. As a consequence, it can be said that in the case where the phosphorus/titanium ratio $R_p$ was 1.0, the area fraction $S_{N1}$ decreased more greatly.

[Composition of Catalyst for Fuel Cells]

The ratio ($N_P/N_{Ti}$) of the number of phosphorus atoms ($N_P$) to the number of titanium atoms ($N_{Ti}$) and the ratio ($N_N/N_{Ti}$) of the number of nitrogen atoms ($N_N$) to the number of titanium atoms were calculated from X-ray photoelectron spectra according to the following method. The number of atoms was calculated, using an analysis software (MultiPak Version 9.2.0.5), from an X-ray photoelectron spectrum measured using an X-ray photoelectron spectrometer (PHI5000 VersaProbe, manufactured by ULVAC-PHI, Inc.).

The ratio of the number of phosphorus atoms to the number of titanium atoms was observed to be 0.17, 0.13, and 0.10 in Example 1, Example 2, and Example 3, respectively. Furthermore, the ratio of the number of phosphorus atoms to the number of titanium atoms was observed to be 0.04 and 0.17 in Example 4 and Example 5, respectively. The ratio of the number of nitrogen atoms to the number of titanium atoms was observed to be 1.10, 1.11, and 0.97 in Example 1, Example 2, and Example 3, respectively. Furthermore, the ratio of the number of nitrogen atoms to the number of titanium atoms was observed to be 0.80, 1.54, and 1.08 in Example 4, Example 5, and Comparative Example 1, respectively.

[Hydrodynamic Voltammogram]

Figure 13:
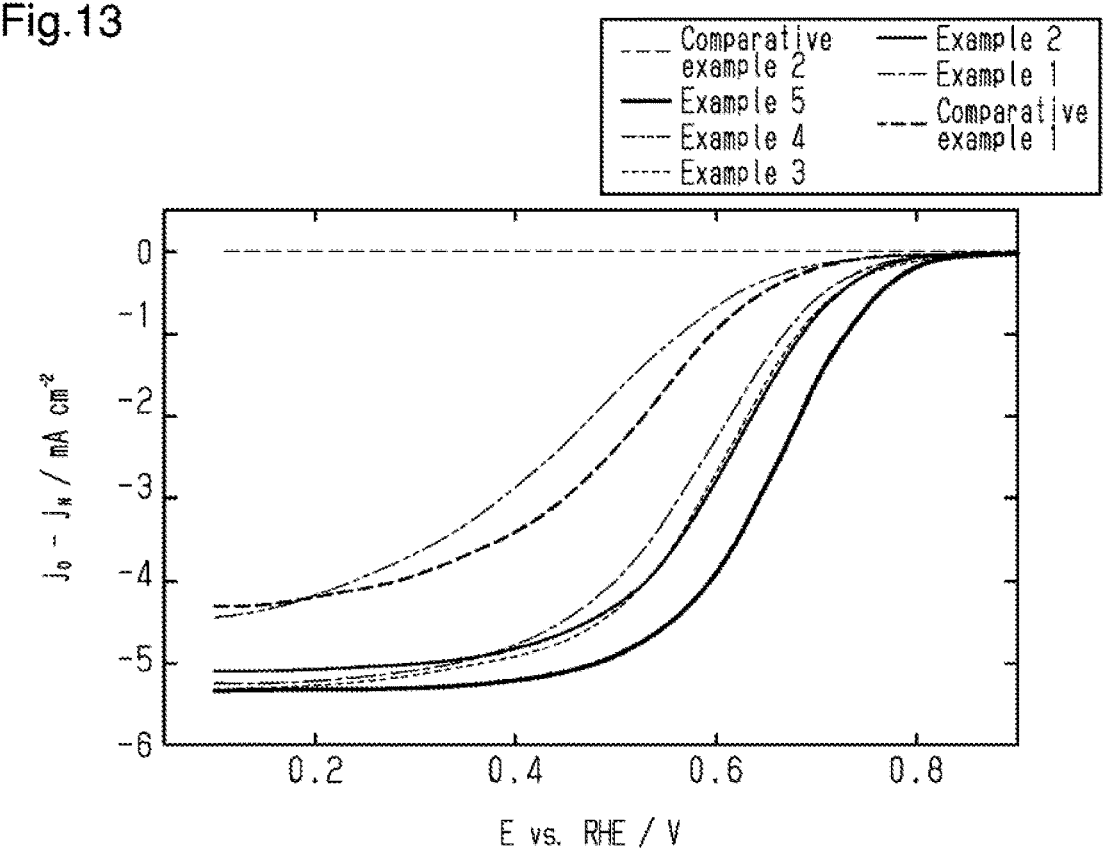
FIG. 13 shows hydrodynamic voltammograms obtained by hydrodynamic voltammetry performed on electrode catalyst layers using catalyst for fuel cells of Example 1 to Example 5, Comparative Example 1, and Comparative Example 2.

FIG. 13 shows hydrodynamic voltammograms obtained by rotating disk voltammetry, which is one method of hydrodynamic voltammetry. FIG. 13 shows hydrodynamic voltammograms respectively corresponding to the catalyst for fuel cells of Example 1 to Example 5, Comparative Example 1, and Comparative Example 2.

In obtaining each hydrodynamic voltammogram, the mass fraction of Nafion® in the electrode catalyst layer was set to 0.05, and the catalyst loading amount, m, was set to 0.86 mgcm$^{-2}$ in Example 1 to Example 5 and Comparative Example 2 excluding Comparative Example 1. The catalyst loading amount, m, was set to 1.00 mgcm$^{-2}$ in Comparative Example 1. A three-electrode cell was used for electrochemical measurement performed at room temperature in 0.1 mol/dm$^3$ sulfuric acid. After sequentially bubbling oxygen gas and nitrogen gas for 1800 seconds, hydrodynamic voltammograms were recorded. At this time, a disc potential (E) for a reversible hydrogen electrode (RHE) was set within the range of 0.05 V to 1.2 V, a scan rate was set to 5 mVs$^{-1}$, a rotation speed of the rotating disk electrode was set to 1500 rpm.

As shown in FIG. 13, in contrast to the similarity of the crystal structures and chemical bonding states, it was observed that the oxygen reduction reaction (ORR) activity in each catalyst for fuel cells significantly depended on the phosphorus/titanium ratio $R_p$. It was observed that when the phosphorus/titanium ratio $R_p$ increased from 0.0 to 0.2, the ORR activity drastically increased. These results indicate that new active sites were formed by doping the TiO$_x$N$_y$ catalyst with phosphorus.

As described above, the results of Comparative Example 1 and Example 1 shown in FIGS. 2 and 3 indicate that the catalyst for fuel cells in Comparative Example 1 and Example 1 each have a core formed of TiN and a surface layer formed of rutile TiO$_2$. Furthermore, these results indicate that the number of oxygen vacancies on the surface layer of rutile structure, that is, the number of vacancies necessary for forming ORR active sites in $TiO_xN_y$ containing no phosphorus atom was the same.

In addition, in the results of Comparative Example 1 and Example 1 shown in FIG. 3, when the phosphorus/titanium ratio $R_p$ falls within the range of 0.0 or more and 0.2 or less, the chemical bonding states of titanium atoms and nitrogen atoms are also the same, and the sole difference between Comparative Example 1 and Example 1 is the presence of $P^{5+}$.

These facts suggest the following. That is, at least one of doped $P^{5+}$ itself and titanium vacancies formed by $P^{5+}$ doping to compensate the charge imbalance formed new active sites for oxygen reduction reaction.

A titanium vacancy on the (110) plane of rutile structure is known to be a dissociative adsorption site for an $O_2$ molecule. In addition, dissociative adsorption of $O_2$ molecules is thought to be the first step for oxygen reduction reaction. Besides, a titanium vacancy can trap up to four protons to form so-called Ruetschi defects similar to the manganese defects in $MnO_2$. Thus, the proton conductivity at the surface of the catalyst for fuel cells is expected to be enhanced by incorporating titanium vacancies into the catalyst for fuel cells.

Coexistence of oxygen vacancies and titanium vacancies on $TiO_2$ has been reported to enhance surface electron conductivity, leading to improvement in lithium/sodium ion battery output.

In view of the above, substitutional $P^{5+}$ doping into a $TiO_2$ lattice is thought to induce at least creation of dissociative adsorption sites for oxygen molecules and enhancement in proton conductivity and electron conductivity. Catalytic activity for oxygen reduction reaction in the $TiO_xN_yP_z$ catalyst is thought to be consequently enhanced.

From the hydrodynamic voltammograms on Example 1 to Example 3, it was observed that even when the phosphorus/titanium ratio $R_p$ increased to 0.5, the ORR activity remained almost constant. Such results are in good agreement with the similarity in crystal structures shown in FIG. 2 and the similarity in chemical bonding states shown in FIG. 3. Whereas, according to the hydrodynamic voltammogram on Example 4, it was observed that when the phosphorus/titanium ratio $R_p$ further increased to 1.0, the ORR activity significantly decreased.

It was observed that the hydrodynamic voltammogram on Example 5 shifted to the positive side by 0.08 V as compared to the hydrodynamic voltammogram on Example 3. As described above, it was observed that the ORR activity was enhanced in the catalyst for fuel cells of Example 5 as compared to the catalyst for fuel cells of Example 3. Meanwhile, it was observed that the catalyst for fuel cells of Comparative Example 2 had ORR activity extremely lower than the catalyst for fuel cells of Example 1 to Example 5 and Comparative Example 1.

MANUFACTURING EXAMPLES

Hereinafter, manufacturing examples of an electrode catalyst layer using the above-described catalyst for fuel cells ($TiO_xN_yP_z$ catalyst) will be described.

Manufacturing Example 1

The catalyst for fuel cells of Example 1 and 20% by mass solution of a polymer electrolyte (trade name: Nafion®, manufactured by DuPont de Nemours, Inc.) were mixed in a solvent, and the solvent including the catalyst for fuel cells and the polymer electrolyte was subjected to dispersion treatment using a planetary ball mill. A first catalyst ink was obtained thereby. In the first catalyst ink, the ratio between the mass of the catalyst for fuel cells and the mass of the polymer electrolyte was set to 1:0.25. A mixed liquid of ultrapure water and 1-propanol was used as the solvent. The ratio between the volume of ultrapure water and the volume of 1-propanol was set to 1:1 in the solvent. In the first catalyst ink, the solid content was set to 15% by mass.

A polytetrafluoroethylene (PTFE) sheet was used as a substrate for drying the first catalyst ink. The first catalyst ink was applied onto the PTFE sheet using a doctor blade, and the first catalyst ink was dried at 80° C. for five minutes in an air atmosphere. Thereafter, a catalyst embedded body in which the catalyst for fuel cells was embedded in the polymer electrolyte was recovered from the substrate.

Carbon particles were prepared as a conductive material. Then, the catalyst embedded body and the carbon particles were mixed in the absence of any solvent using a planetary ball mill. Thereafter, the mixture of the catalyst embedded body and the carbon particles was subjected to heat treatment at 70° C. The ratio between the mass of the catalyst embedded body and the mass of the carbon particles was set to 1:1.

The heated catalyst embedded body and carbon particles, and 20% by mass of a polymer electrolyte solution (trade name: Nafion®, manufactured by DuPont de Nemours, Inc.) were mixed in a solvent, and the solvent including the catalyst embedded body and the carbon particles was subjected to dispersion treatment using a planetary ball mill. A second catalyst ink was obtained thereby. In the second catalyst ink, the ratio between the mass of the catalyst for fuel cells, the mass of the carbon particles, and the mass of the polymer electrolyte was set to 1:1:0.8. A mixed liquid of ultrapure water and 1-propanol was used as the solvent. The ratio between the volume of ultrapure water and the volume of 1-propanol in the solvent was set to 1:1. In addition, in the second catalyst ink, the solid content was set to 15% by mass.

A PTFE sheet was used as a substrate for transfer. The second catalyst ink was applied onto the PTFE sheet using a doctor blade, and the second catalyst ink was dried at 80° C. for five minutes in an air atmosphere. At this time, the thickness of an electrode catalyst layer was adjusted so that the amount of the catalyst supported became 5.0 mg/cm². A cathode-side electrode catalyst layer of Manufacturing Example 1 was obtained thereby.

Manufacturing Example 2

The same catalyst for fuel cells as in Manufacturing Example 1, carbon particles, and 20% by mass of a polymer electrolyte solution were mixed in a solvent, and the solvent including the catalyst for fuel cells, the carbon particles, and a polymer electrolyte was subjected to dispersion treatment using a planetary ball mill. A catalyst ink was obtained thereby. In the catalyst ink, the ratio between the mass of the catalyst for fuel cells, the mass of the carbon particles, and the mass of the polymer electrolyte was set to 1:1:0.8. A mixed liquid of ultrapure water and 1-propanol was used as the solvent. The ratio between the volume of ultrapure water and the volume of 1-propanol in the solvent was set to 1:1. In addition, in the catalyst ink, the solid content was set to 15% by mass.

A PTFE sheet was prepared as a substrate for transfer as with the case of Manufacturing Example 1. The catalyst ink was applied onto the PTFE sheet and dried in the same manner as in Manufacturing Example 1. At this time, the thickness of an electrode catalyst layer was adjusted so that the amount of the catalyst supported became 5.0 mg/cm$^2$. A cathode-side electrode catalyst layer of Manufacturing Example 2 was obtained thereby.

[Anode-Side Electrode Catalyst Layer]

A carbon-supported platinum catalyst in which an amount of platinum supported was 50% by mass, and 20% by mass of a polymer electrolyte solution were mixed in a solvent, and the solvent including the carbon-supported platinum catalyst and a polymer electrolyte was subjected to dispersion treatment using a planetary ball mill. At this time, dispersion time was set to 60 minutes. A catalyst ink for an anode-side electrode catalyst layer was obtained thereby. In the catalyst ink, the ratio between the mass of carbon in platinum-supporting carbon and the mass of the polymer electrolyte was set to 1:1. A mixed liquid of ultrapure water and 1-propanol was used as the solvent. The ratio between the volume of ultrapure water and the volume of 1-propanol in the solvent was set to 1:1. In addition, in the catalyst ink, the solid content was set to 10% by mass. The catalyst ink was applied onto a substrate for transfer and dried in the same manner as in Manufacturing Example 1. At this time, the thickness of an electrode catalyst layer was adjusted so that the amount of the catalyst supported became 0.1 mg/cm$^2$. An anode-side electrode catalyst layer was obtained thereby.

[Polymer Electrolyte Fuel Cell]

Each of the cathode-side electrode catalyst layers of Manufacturing Example 1 and Manufacturing Example 2 and the anode-side electrode catalyst layer were punched into a square shape of 5 cm$^2$ together with the PTFE sheet on which each electrode catalyst layer was formed. Then, a polymer electrolyte membrane was prepared, and the transfer sheet was disposed against the polymer electrolyte membrane so that one face of the polymer electrolyte membrane faced the cathode-side electrode catalyst layer of Manufacturing Example 1, and the other face faced the anode-side electrode catalyst layer. Then, the laminate including the polymer electrolyte membrane and the two electrode catalyst layers was subjected to hot pressing under the conditions of 130° C. and 10 minutes to obtain a membrane electrode assembly. In addition, with respect to the cathode-side electrode catalyst layer of Manufacturing Example 2, a membrane electrode assembly including the cathode-side electrode catalyst layer of Manufacturing Example 2 was obtained in the same manner as in the case where the cathode-side electrode catalyst layer of Manufacturing Example 1 was used. Each membrane electrode assembly was sandwiched between two carbon paper sheets, which were gas diffusion layers, and further nipped by two separators to obtain a polymer electrolyte fuel cell composed of a single cell.

[Power Generation Performance]

[Evaluation Conditions]

Power generation performance of each polymer electrolyte fuel cell was evaluated using a fuel cell measurement device. At this time, the temperature of the polymer electrolyte fuel cell was set to 80° C., and the relative humidity in the anode and the cathode was set to 100%. Pure hydrogen was used as fuel gas, and pure oxygen was used as oxidizer gas. The flow rates of the fuel gas and oxidizer gas were maintained constant during evaluation period of power generation performance.

[Measurement Results]

It was observed that the polymer electrolyte fuel cell including the cathode-side electrode catalyst layer of Manufacturing Example 1 had power generation performance superior to the polymer electrolyte fuel cell including the cathode-side electrode catalyst layer of Manufacturing Example 2. It was observed that power generation performance of the polymer electrolyte fuel cell including the cathode-side electrode catalyst layer of Manufacturing Example 1 was enhanced especially around 0.7 V. In addition, it was observed that the polymer electrolyte fuel cell including the cathode-side electrode catalyst layer of Manufacturing Example 1 had power generation performance about 1.8 times higher than that of the polymer electrolyte fuel cell including the cathode-side electrode catalyst layer of Manufacturing Example 2 around 0.7 V.

It is thought that in the cathode-side electrode catalyst layer of Manufacturing Example 1, by virtue of the catalyst for fuel cells embedded in the polymer electrolyte, the proton conductivity at the surface of the catalyst for fuel cells was enhanced, and the number of reaction active sites was consequently increased in the cathode-side electrode catalyst layer; therefore, power generation performance improved.

The described-above embodiment of the catalyst for fuel cells, electrode catalyst layer, membrane electrode assembly, polymer electrolyte fuel cell, manufacturing method of the catalyst for fuel cells, and manufacturing method of the electrode catalyst layer, has the following advantages.

(1) By virtue of doping an oxide of a transition metal with nitrogen atoms and pentavalent phosphorus atoms, catalytic activity for oxygen reduction reaction is enabled to be exerted even in a composition in which a content of platinum is limited.

(2) In the case where titanium atoms are contained as transition metal atoms, catalytic activity for oxygen reduction reaction can be enhanced by the ratio of the number of phosphorus atoms to the number of titanium atoms falling within the range of 0.1 or more and 0.2 or less.

(3) In the case where titanium atoms are contained as the transition metal, catalytic activity for oxygen reduction reaction is enhanced by the ratio of the number of nitrogen atoms to the number of titanium atoms falling within the range of 1.0 or more and 1.5 or less.

(4) By virtue of a core and a surface layer both containing pentavalent phosphorus atoms, catalytic activity for oxygen reduction reaction is enabled to be exerted.

(5) In manufacturing a catalyst for fuel cells, a $TiO_xN_yP_z$ catalyst in which activity for oxygen reduction reaction is enhanced is obtained by a phosphorus/titanium ratio $R_p$ falling within the range of 0.2 or more and 0.5 or less.

The embodiments described above may be modified as described below.

[Phosphorus/Titanium Ratio $R_p$]

In manufacturing a catalyst for fuel cells, the phosphorus/titanium ratio $R_p$ may be less than 0.2 or may be more than 0.5. A $TiO_xN_yP_z$ catalyst having catalytic activity for oxygen reduction reaction can be obtained even when the phosphorus/titanium ratio $R_p$ is less than 0.2 and when the phosphorus/titanium ratio $R_p$ is more than 0.5.

[Composition of Catalyst for Fuel Cells]

The catalyst for fuel cells may not satisfy at least one of requirement 1 and requirement 2 described above. Even in such a case, when the catalyst for fuel cells is represented by a chemical formula $TiO_xN_yP_z$ and contains pentavalent phosphorus atoms, an advantage similar to item (1) described above is provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst for fuel cells comprising: an oxygen atom, a nitrogen atom, a pentavalent phosphorus atom, and a transition metal atom, wherein
when the transition metal atom is represented by M, the catalyst for fuel cells is represented by a chemical formula $MO_xN_yP_z$, and
the transition metal atom is at least one selected from the group consisting of a titanium atom, a tantalum atom, a niobium atom, and a zirconium atom.

2. The catalyst for fuel cells according to claim 1, wherein
the transition metal atom is the titanium atom, and
z is 0.1 or more and 2.0 or less.

3. The catalyst for fuel cells according to claim 1, wherein
the transition metal atom is the titanium atom, and
y is 0.8 or more and 1.5 or less.

4. The catalyst for fuel cells according to claim 1, comprising a core and a surface layer covering the core, wherein
the core includes a TiN lattice,
the surface layer includes a $TiO_2$ lattice, and
the core and the surface layer both include the pentavalent phosphorus atom.

5. A membrane electrode assembly comprising:
a solid polymer electrolyte membrane; and
an electrode catalyst layer comprising the catalyst for fuel cells according to claim 1, a polymer electrolyte, and a conductive material, wherein
the electrode catalyst layer is bonded to the solid polymer electrolyte membrane.

6. A polymer electrolyte fuel cell comprising:
the membrane electrode assembly according to claim 5; and
a second electrode catalyst layer.

* * * * *